United States Patent [19]
Wolters

[11] 4,080,937
[45] Mar. 28, 1978

[54] AIR-COMPRESSING FOUR-CYCLE INTERNAL COMBUSTION ENGINE WITH DIRECT FUEL INJECTION

[75] Inventor: Gerhard Wolters, Gaggenau, Germany

[73] Assignee: Daimler-Benz Aktiengesellschaft, Germany

[21] Appl. No.: 670,906

[22] Filed: Mar. 26, 1976

[30] Foreign Application Priority Data
Mar. 27, 1975 Germany .............................. 2513587

[51] Int. Cl.² .......................... F02B 3/06; F02M 61/14
[52] U.S. Cl. .................................. 123/32 G; 123/32 R
[58] Field of Search .............................. 123/32 R, 32 G

[56] References Cited
U.S. PATENT DOCUMENTS

| | | | |
|---|---|---|---|
| 1,378,176 | 5/1921 | Kent-Norris | 123/32 R |
| 1,758,375 | 5/1930 | Riehm | 123/32 R |
| 2,030,086 | 2/1936 | Woolson | 123/32 G |
| 2,975,772 | 3/1961 | Böttger | 123/32 R |
| 3,469,564 | 9/1969 | Hiereth | 123/32 R X |
| 3,580,230 | 5/1971 | Hoffmann et al. | 123/32 R |

*Primary Examiner*—Alan Cohan
*Assistant Examiner*—Gerald A. Michalsky
*Attorney, Agent, or Firm*—Craig & Antonelli

[57] ABSTRACT

An air-compressing four-cycle internal combustion engine with direct fuel injection, especially for the drive of motor vehicles, in which a first injection valve is provided for injecting fuel into a combustion space which is so constructed and arranged that good outputs with favorable fuel consumption are attainable; in lieu of the first injection valve, a second injection valve can be selectively operated which is fed with fuel from a second injection pump or from a separate pump plunger and which is so constructed and arranged that low combustion noises are achieved without regard to output and consumption.

9 Claims, 2 Drawing Figures

U.S. Patent
March 28, 1978
4,080,937
FIG. 1
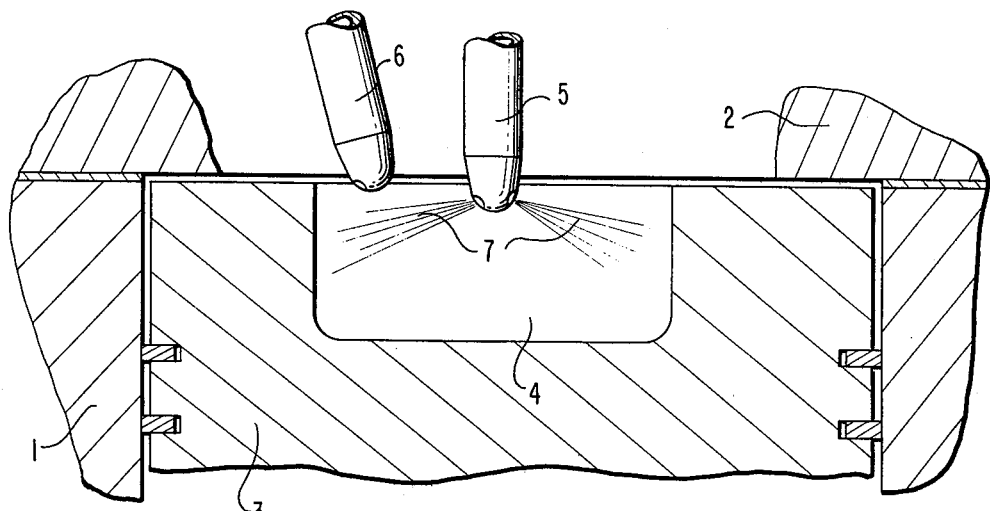
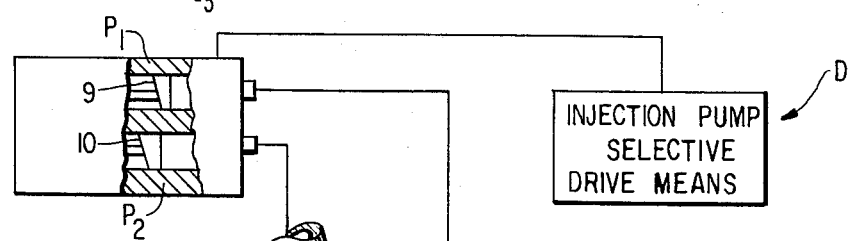
INJECTION PUMP SELECTIVE DRIVE MEANS
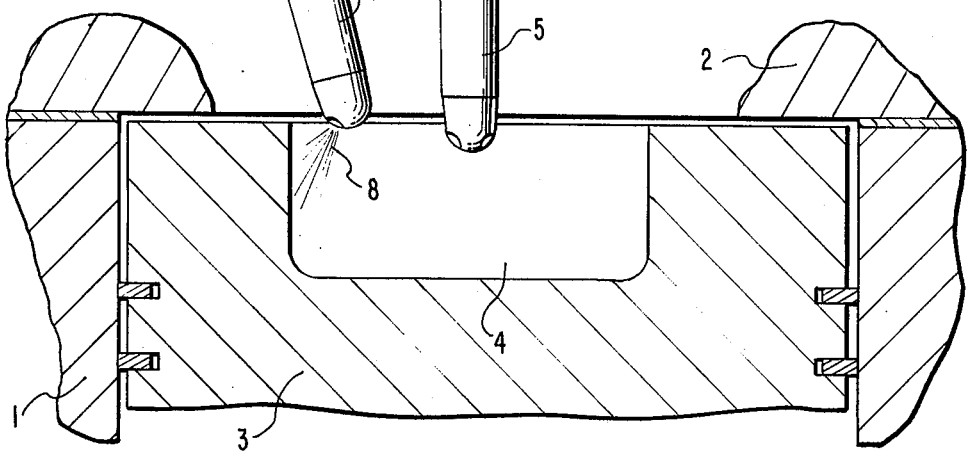
FIG. 2

AIR-COMPRESSING FOUR-CYCLE INTERNAL COMBUSTION ENGINE WITH DIRECT FUEL INJECTION

The present invention relates to an air-compressing four-cycle internal combustion engine with direct injection, especially for the drive of motor vehicles, in which fuel supplied by an injection pump is injected by way of an injection valve into a combustion space provided, for example, in the piston of the internal combustion engine, and in which the injection valve is so designed as regards its construction and arrangement that good power outputs are achievable with favorable consumption.

An internal combustion engine of this type, designed for optimum performance and minimum consumption, produces combustion noises which are noticed as annoying, for example, in the arrangement of the internal combustion engine in a commercial vehicle or in a bus when driving in built-up areas, especially in cities. Measures to influence the combustion noises from the side of the combustion increase the consumption and reduce the performance or power output.

The present invention is concerned with the task to so construct an internal combustion engine that notwithstanding design for optimum output and minimum consumption, also selectively an operation is possible in which above all smaller combustion noises are poduced without regard to favorable outputs and acceptable consumption values.

The underlying problems are solved according to the present invention in that a second injection valve is provided to be put into operation in lieu of the first injection valve, to which fuel is fed from a second injection pump or from a separate pump plunger and which, as regards construction and arrangement, is so designed that smaller combustion noises are achieved without regard to power output and fuel comsumption.

It becomes possible by the present invention to drive an internal combustion engine with two different combustion processes. Thus, for example, the driving internal combustion engine of a bus may be operated in city traffic with the combustion process producing low noises while accepting smaller outputs and a poor consumption and outside the city, for example, on highway traffic, with the combustion process producing stronger noises with good power output and low specific consumptions.

In an advantageous construction according to the present invention, the first injection valve may be constructed as multi-apertured nozzle, especially as four-hole nozzle and may be so arranged that the discharged fuel jets are essentially air-distributed, and the second injection valve may be so constructed and arranged that the injected fuel is distributed essentially at the combustion space walls.

The second injection valve may be advantageously constructed as single-hole nozzle, in which the discharging fuel jet is directed tangentially to the circumference of the combustion space against the wall thereof.

Accordingly, it is an object of the present invention to provide an air-compressing four-cycle internal combustion engine with direct injection which avoids by simple means the aforementioned shortcomings and drawbacks encountered in the prior art.

Another object of the present invention resides in an air-compressing four-cycle internal combustion engine with direct fuel injection which effectively solves the problem of noise production in the city traffic when utilizing an engine designed for optimum power output and fuel consumption.

A further object of the present invention resides in an air-compressing four-cycle internal combustion engine with direct injection which can be selectively operated with good power output and favorable fuel consumption on highways and with low noise production and lower power output and less favorable fuel consumption in city traffic.

Still another object of the present invention resides in an air-compressing four-cycle internal combustion engine with direct fuel injection which is simple in construction, requires relatively few additional parts and can be operated and controlled in a simple manner to achieve the aims of the present invention.

These and further objects, features and advantages of the present invention will become more apparent from the following description when taken in connection with the accompanying drawing which shows, for purposes of illustration only, one embodiment in accordance with the present invention, and wherein:

FIG. 1 is a partial longitudinal cross-sectional view through a cylinder of an internal combustion engine and illustrating one type of operation thereof; and FIG. 2 is a similar partial longitudinal cross-sectional view through the same internal combustion engine as shown in FIG. 1 and illustrating a second type of operation thereof.

Referring to the drawing wherein like reference numerals are used throughout the two views to designate like parts, according to FIGS. 1 and 2, reference numeral 1 indicates an air-compressing four-cycle internal combustion engine with direct fuel injection, in which two injection valves 5 and 6 are arranged in the cylinder head 2 above the combustion space 4 provided in the piston 3. The injection valve 5 is constructed as four-hole nozzle and is so arranged that the discharged fuel jets 7 remain essentially air-distributed in the combustion space 4. The injection valve 6 is constructed as single-hole nozzle and is so arranged that the fuel jet 8 impinges approximately tangentially at the circumferential wall of the combustion space 4 and is thus essentially wall-distributed.

The two injection valves 5 and 6 are connected to different injection pumps whose drive from the internal combustion engine is so constructed that selectively only the one injection pump and selectively only the other injection pump is driven. Since such selective drive means generally designated by the reference D are known in the art and form no part of the present invention, a detailed description thereof is dispensed with herein for the sake of simplicity.

In highway traffic, the internal combustion engine 1 is operated according to FIG. 1 with the injection valve 5 and the associated injection pump P1 including a pump plunger 9. The fuel jets 7 are essentially air-distributed. The output of the internal combustion engine is optimal. The specific fuel consumption is favorable. The noise development corresponds to this type of combustion process. The injection valve 6 and the associated injection pump P2 and pump plunger 10 are inoperable, i.e., at rest.

In the city traffic, the injection valve 5 and the associated injection pump P1 are rendered inoperable, and the injection valve 6 with the injection pump P2 coordinated thereto are set into operation. This takes place by conventional means, for example, by manually operating the aforementioned selective drive means. A fuel jet 8 is injected by the injection valve 6 tangentially in the direction toward the wall of the combustion space 4. The combustion noise is low. In contrast thereto, the output and consumption are less favorable.

In lieu of the injection valves 5 and 6, of course, also injection valves of other types of construction may be used. The injection valve 5, for example, may also be constructed as three-hole nozzle. The injection valve 6 may also be constructed as two-hole nozzle or as pin nozzle. It is also possible to direct the fuel out of the injection valve 6 against the bottom wall of the combustion space 4.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:
1. An air-compressing four-cycle internal combustion engine with direct fuel injection, which comprises a first injection valve means for injecting fuel supplied from a first injection pump into a combustion space means only when the internal combustion engine is operated in highway traffic, said first injection valve means being so designed as regards construction and arrangement that an optimal output of the internal combustion engine is attainable with favorable fuel consumption, characterized in that a second injection valve means is provided for injecting fuel supplied from a second injection pump into the combustion space means, said second injection valve means being so designed as regards construction and arrangement thereof that low combustion noises are achieved without regard to an output of the internal combustion engine and a consumption of the fuel, and in that means are provided for selectively operating said second injection valve means in lieu of said first injection valve means such that only the second injection pump is effective when the internal combustion engine is operated in city traffic.

2. An internal combustion engine according to claim 1, characterized in that the combustion space means is provided in the piston of the internal combustion engine.

3. An internal combustion engine according to claim 1, characterized in that fuel is fed to the second injection valve means from a separate pump plunger.

4. An internal combustion engine according to claim 1, characterized in that the first injection valve means is constructed as multi-apertured nozzle and is so arranged that the discharged fuel jets are essentially air-distributed while the second injection valve means is so constructed and arranged that the discharged fuel is essentially wall-distributed at the combustion space wall.

5. An internal combustion engine according to claim 4, characterized in that the first injection valve means is a four-hole nozzle.

6. An internal combustion engine according to claim 4, characterized in that the second injection valve means is constructed as single-hole nozzle in which the discharged fuel jet is directed tangentially to the circumference of the combustion space means against the walls thereof.

7. An internal combustion engine according to claim 6, characterized in that the first injection valve means is a four-hole nozzle.

8. An internal combustion engine according to claim 7, characterized in that fuel is fed to the second injection valve means from a second injection pump.

9. An internal combustion engine according to claim 7, characterized in that fuel is fed to the second injection valve means from a separate pump plunger.

* * * * *